United States Patent [19]

Aizawa et al.

[11] Patent Number: 5,405,183

[45] Date of Patent: Apr. 11, 1995

[54] DUTY CYCLE CONTROLLER FOR ANTI-LOCK BRAKING-PRESSURE REGULATING VALVE, USING WHEEL SPEED DEVIATION FROM TARGET VALUE AND/OR TIME DERIVATIVE THEREOF

[75] Inventors: Hideyuki Aizawa, Susono; Akira Nakamura, Kannami; Shiro Monzaki; Masatoshi Yoneyama, both of Susono, all of Japan

[73] Assignee: Toyota Jidosha Kabushiki Kaisha, Toyota, Japan

[21] Appl. No.: 142,145

[22] Filed: Oct. 28, 1993

[30] Foreign Application Priority Data

Nov. 5, 1992 [JP] Japan .................. 4-321288

[51] Int. Cl.$^6$ .............................................. B60T 8/32
[52] U.S. Cl. .................... 303/103; 303/110; 303/100
[58] Field of Search .............. 303/100, 102, 103, 110, 303/105, 106, 109, 111; 364/426.01, 426.02, 426.03; 188/181 A, 181 C; 342/70, 71, 104

[56] References Cited

U.S. PATENT DOCUMENTS

| | | | |
|---|---|---|---|
| 3,637,264 | 1/1972 | Leiber et al. | 303/105 |
| 4,346,774 | 8/1982 | Hirota et al. | |
| 4,432,229 | 2/1984 | Nowogrodzki | |
| 4,713,665 | 12/1987 | Phelan | |
| 4,800,498 | 1/1989 | Matsui et al. | 303/100 |
| 4,900,101 | 2/1990 | Becker et al. | |
| 4,912,641 | 3/1990 | Kuwana et al. | 303/100 |
| 4,932,726 | 6/1990 | Iwata et al. | |
| 4,986,611 | 1/1991 | Goshima et al. | 303/100 |
| 5,204,682 | 4/1993 | Beasley | |
| 5,334,983 | 8/1994 | Ikeda et al. | 342/70 |

FOREIGN PATENT DOCUMENTS

| | | |
|---|---|---|
| 3825639 | 7/1988 | Germany. |
| 63-64861 | 3/1988 | Japan. |
| 1-182155 | 7/1989 | Japan. |
| 2-70561 | 3/1990 | Japan. |
| 2-129960 | 10/1990 | Japan. |

*Primary Examiner*—Douglas C. Butler
*Attorney, Agent, or Firm*—Oliff & Berridge

[57] ABSTRACT

An anti-lock braking-pressure control apparatus for a vehicle having a plurality of wheels, including at least one wheel speed sensor which detects respective actual speeds of the wheels of the vehicle, at least one solenoid-operated valve which regulates respective braking pressures applied to the wheels, a ground-speed sensor which detects a ground-speed of the vehicle as a running speed thereof relative to a road surface, and a controller which electrically operates, for preventing locking of each of the wheels, a corresponding one of the one or more solenoid-operated valves at a controlled duty cycle, the controller selecting one of a plurality of duty-cycle determining rules, and determining the duty cycle of the corresponding one solenoid-operated valve according to the selected one duty-cycle determining rule, the plurality of duty-cycle determining rules comprising (A) a first determining rule wherein the duty cycle is determined based on both (a) a wheel speed error that is a deviation of the actual speed of the each wheel from a target wheel speed obtained based on the ground-speed of the vehicle, and (b) a time derivative of the wheel speed error, and (B) a second determining rule wherein the duty cycle is determined based on one of (a) the wheel speed error and (b) the time derivative of the wheel speed error.

14 Claims, 9 Drawing Sheets

FIG. 5

| | "DUTY" CALCULATING EXPRESSION |
|---|---|
| PRESSURE DECREASE | $A \cdot (G_R - G_W)$ |
| "QUICK" PRESSURE INCREASE | $B \cdot (G_W - G_R) + C \cdot (V_W - V_R)$ |
| "SLOW" PRESSURE INCREASE | $D \cdot (V_W - V_R)$ |

DUTY CYCLE CONTROLLER FOR ANTI-LOCK BRAKING-PRESSURE REGULATING VALVE, USING WHEEL SPEED DEVIATION FROM TARGET VALUE AND/OR TIME DERIVATIVE THEREOF

BACKGROUND OF THE INVENTION

1. Field of the Invention

The present invention relates generally to an anti-lock or anti-skid braking-pressure control apparatus for a vehicle, and more particularly to the technique of improving the accuracy of control of the control apparatus.

2. Related Art Statement

There is known an anti-lock braking-pressure control apparatus which is used on a vehicle for reducing the braking distance, and improving the driving stability, upon application of a braking force by a driver to the brake system of the vehicle. An example of the conventional control apparatus is disclosed in laid-open Publication No. 1-182155 of unexamined Japanese Patent Application. The disclosed control apparatus includes (a) at least one wheel speed sensor which detects respective actual speeds of a plurality of wheels of a vehicle, (b) at least one solenoid-operated valve which regulates respective braking pressures applied to the wheels, and (c) a controller which electrically operates, for preventing locking of each of the wheels upon application of a braking force to the vehicle, the corresponding solenoid-operated valve based on a relationship between (1) the actual speed of the wheel in question detected by the corresponding wheel speed sensor and (2) a running speed of the vehicle.

The above-identified control apparatus utilizes the fact that the highest one of respective actual wheel speeds of a plurality of wheels of a vehicle approximates the running speed of the vehicle to a high degree. More specifically described, the vehicle speed is estimated based on the actual wheel speeds of the plurality of wheels, and an anti-lock braking-pressure regulating operation is carried out based on a relationship between the actual wheel speed of the wheel in question and the estimated vehicle speed. However, this technique suffers from limits to improvement of the accuracy of estimation of the vehicle speed, therefore, limits to improvement of the accuracy of control of the control apparatus.

In the above-described technical background, the Assignee of the present application had filed U.S. patent application Ser. No. 07/942,981, on Sep. 10, 1992 (U.S. Pat. No. 5,334,983 disclosing an anti-lock braking-pressure control apparatus which includes, in addition to the elements (a) to (c) of the above-identified first control apparatus, (d) a ground-speed sensor which detects a ground-speed of a vehicle as a running speed thereof relative to a road surface. In the disclosed control apparatus, the controller electrically operates, for regulating the braking pressure applied to a wheel in question, a corresponding solenoid-operated valve at a duty cycle controlled based on at least (i) a wheel speed error that is a deviation of the actual speed of the wheel from a target wheel speed obtained based on the ground-speed of the vehicle and (ii) a time derivative of the wheel speed error. More specifically, the disclosed control apparatus is designed such that the controller determines, at every time, the duty cycle of the solenoid-operated valve based on both of the two parameters (i) and (ii).

In the case of the above-described second control apparatus, however, since the duty cycle is determined whenever based on both the two parameters (i) and (ii), the control apparatus suffers from, for example, a tendency that the braking pressure applied to the wheel in question is excessively decreased. Thus, it cannot be said that the accuracy of control of the control apparatus is sufficiently high. That is, it is not advantageous that the only and same determining rule is used whenever for determining a duty cycle.

SUMMARY OF THE INVENTION

It is therefore an object of the present invention to provide an anti-lock braking-pressure control apparatus which selects an appropriate one of a plurality of different duty-cycle determining rules and determines a duty cycle according to the selected rule.

It is another object of the present invention to provide a control apparatus wherein an appropriate duty-cycle determining rule is selected based on a slipping condition of a wheel in question and a duty cycle is determined according to the selected rule.

It is yet another object of the present invention to provide a control apparatus wherein an appropriate duty-cycle determining rule is selectable by a driver according to his or her judgment or preference, irrespective of a slipping condition of a wheel in question, and a duty cycle is determined according to the selected rule.

The above object or objects has or have been achieved by the present invention. According to the present invention, there is provided an anti-lock braking-pressure control apparatus for a vehicle having a plurality of wheels, comprising: at least one wheel speed sensor which detects respective actual speeds of the wheels of the vehicle; at least one solenoid-operated valve which regulates respective braking pressures applied to the wheels; a ground-speed sensor which detects a ground-speed of the vehicle as a running speed thereof relative to a road surface; and a controller which electrically operates, for preventing locking of each of the wheels, a corresponding one of the at least one solenoid-operated valve at a controlled duty cycle, the controller selecting one of a plurality of duty-cycle determining rules, and determining the duty cycle of the corresponding one solenoid-operated valve according to the selected one duty-cycle determining rule, the plurality of duty-cycle determining rules comprising (A) a first determining rule wherein the duty cycle is determined based on both (a) a wheel speed error that is a deviation of the actual speed of the each wheel from a target wheel speed obtained based on the ground-speed of the vehicle, and (b) a time derivative of the wheel speed error, and (B) a second determining rule wherein the duty cycle is determined based on one of (a) the wheel speed error and (b) the time derivative of the wheel speed error. As long as the present invention is concerned, the wheel speed error (a) may be defined as either the wheel speed error itself or a so-called "slip ratio" that is obtained by dividing the wheel speed error by the ground-speed of the vehicle. Similarly, the time derivative (b) of the wheel speed error may be defined as either the time derivative itself or a time derivative of the above-indicated "slip ratio".

In the anti-lock braking-pressure control apparatus constructed as described above, the ground-speed sensor is employed for detecting the ground-speed of the vehicle as the running speed thereof relative to the road surface, and the controller electrically operates, for preventing locking of each of the wheels upon application of a braking force to the vehicle, a corresponding one of the one or more solenoid-operated valves at a controlled duty cycle. The controller determines the duty cycle according to a selected one of the different duty-cycle determining rules comprising (A) the first determining rule wherein the duty cycle is determined based on both (a) the wheel speed error and (b) the time derivative of the wheel speed error, and (B) the second determining rule wherein the duty cycle is determined based on one of (a) the wheel speed error and (b) the time derivative of the wheel speed error. Thus, the present control apparatus determines duty cycles according to a more appropriate rule or rules, and thereby improves the accuracy of anti-lock control.

In a preferred embodiment of the present invention, the controller comprises: rule selecting means for estimating a slipping condition of the each wheel based on at least one of the actual speed of the each wheel and a time derivative of the actual speed of the each wheel, and selecting one of the plurality of duty-cycle determining rules based on the estimated slipping condition of the each wheel; and duty-cycle determining means for determining the duty cycle of the corresponding one solenoid-operated valve according to the selected one duty-cycle determining rule. In this case, the control apparatus determines each duty cycle with high precision, thereby highly improving the accuracy of anti-lock control.

In another embodiment of the present invention, the controller comprises: a driver's operable input device for selecting one of the plurality of duty-cycle determining rules; and duty-cycle determining means for determining the duty cycle of the corresponding one solenoid-operated valve according to the selected one duty-cycle determining rule. In this case, the control apparatus permits the driver to select, by his or her judgment or preference, an appropriate duty-cycle determining rule, thereby improving the ease of use of the apparatus.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 5 is a table for explaining a duty-cycle calculating expression used by the computer of the controller for determining a duty cycle for each pressure-regulate mode;

DETAILED DESCRIPTION OF THE PREFERRED EMBODIMENTS

Figure 1:
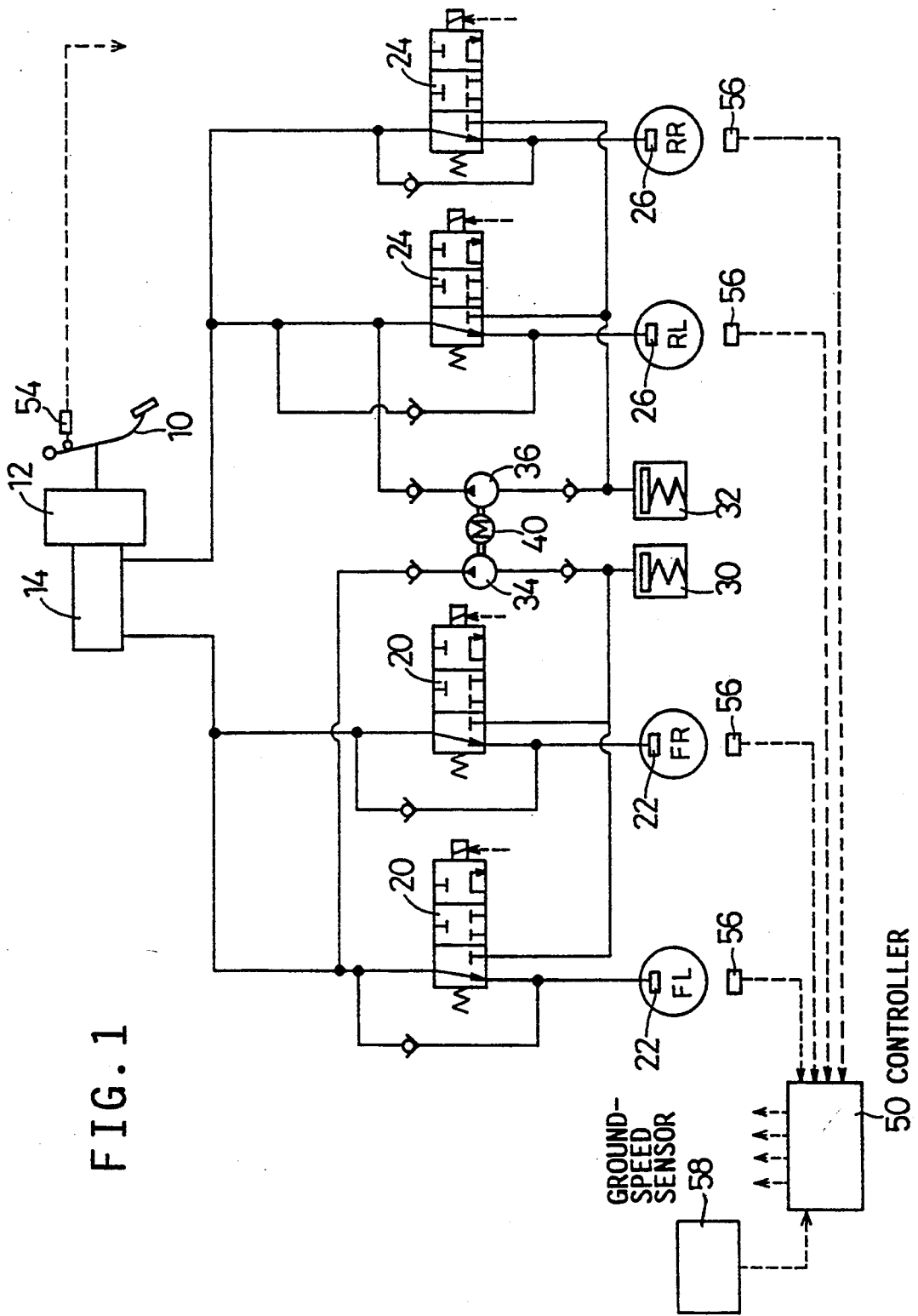
FIG. 1 is a diagrammatic view of an anti-lock brake system including an anti-lock braking-pressure control apparatus embodying the present invention.

Referring first to FIG. 1, there is shown one embodiment of an anti-lock or anti-skid braking-pressure control apparatus of the present invention for controlling a brake system of an automotive vehicle.

In FIG. 1, reference numeral 10 designates a brake pedal serving as a brake operating member operated by a vehicle driver for applying a braking force to the vehicle. The brake pedal 10 is coupled via a booster 12 to a master cylinder 14. The master cylinder 14 is of a tandem type wherein two pressure chambers (not shown) are provided in series. One of the two pressure chambers of the master cylinder 14 is connected via two front solenoid-operated valves 20, 20 to two front wheel cylinders 22, 22, respectively, for applying respective braking pressures to a front-left wheel, FL, and a front-right wheel, FR, of the vehicle. The other pressure chamber of the master cylinder 14 is connected via two rear solenoid-operated valves 24, 24 to two rear wheel cylinders 26, 26, respectively, for applying respective braking pressures to a rear-left wheel, RL, and a rear-right wheel, RR, of the vehicle.

Each of the four solenoid-operated valves 20, 20, 24, 24 is normally placed in a pressure-increase position where the valve permits a first fluid communication between a corresponding wheel cylinder 22, 22, 26, 26 and the master cylinder 14 and simultaneously inhibits a second fluid communication between the corresponding wheel cylinder 22, 22, 26, 26 and a corresponding fluid reservoir 30, 32. Depending upon the manners of energizing or deenergizing of the solenoid or solenoids provided for each valve 20, 20, 24, 24, each valve additionally takes a pressure-decrease position where the valve inhibits the above first fluid communication and simultaneously permits the above second fluid communication, and a pressure-hold position where the valve inhibits both the first and second fluid communications.

In FIG. 1, each of the four solenoid-operated valves 20, 20, 24, 24 is illustrated for easier understanding purposes only such that each valve is constituted by a three-position valve. In fact, however, each valve 20, 20, 24, 24 is constituted by a combination of a pressure-increase valve in the form of a normally-opened-type solenoid-operated open/close valve, and a pressure-decrease valve in the form of a normally-closed-type solenoid-operated open/close valve. Therefore, each of the four solenoid-operated valves 20, 20, 24, 24 is placed in the pressure-increase position by deenergizing both the pressure-increase and pressure-decrease valves thereof, in the pressure-decrease position by energizing both the pressure-increase and pressure-decrease valves, and in the pressure-hold position by energizing the pressure-increase valve and deenergizing the pressure-decrease valve. Thus, the braking pressure applied to each of the four vehicle wheels FL, FR, RL, RR is selectively regulated in one of a pressure-increase, a pressure-decrease, and a pressure-hold mode (described later), by controlling a corresponding combination of two solenoid-operated open/close valves. Hereinafter, control signals supplied to each of the four solenoid-operated valves 20, 20, 24, 24 for carrying out the pressure-increase, pressure-decrease, and pressure-hold modes are referred to as a pressure-increase (PI) signal, a pressure-decrease (PD) signal, and a pressure-hold (PH) signal, respectively. The PI and PD signals are referred to as pressure-change (PC) signals.

The fluid reservoirs 30, 32 are connected via respective fluid pumps 34, 36 to the master cylinder 14. The hydraulic fluids in the respective reservoirs 30, 32 are pumped up by the corresponding pumps 34, 36 so as to be back to the corresponding pressure chambers of the master cylinder 14. The two fluid pumps 34, 36 are actuated by a common electric motor 40. Thus, this brake system is of a fluid-circulation type.

Each of the four solenoid-operated valves 20, 20, 24, 24 is electrically controlled by a controller 50. The controller 50 is essentially constituted by a computer including a central processing unit (CPU), a read only memory (ROM) 51 (FIG. 2), a random access memory (RAM) 52 (FIG. 11), an input interface, and an output interface. The CPU of the controller 50 is connected via the output interface to the solenoids of the valves 20, 20, 24, 24. Meanwhile, a brake switch 54, four wheel speed sensors 56, 56, 56, 56, and a ground-speed sensor 58 are connected via the input interface to the CPU of the controller 50. The brake switch 54 is normally placed in an "OFF" position, and when the brake pedal 10 is depressed by a foot of the driver, the brake switch 54 is placed in an "ON" position. Each of the four wheel speed sensors 56 detects the rotation speed of a member which rotates with a corresponding one of the four wheels FL, FR, RL, RR, so as to detect an actual speed, $V_W$, of the corresponding wheel. The ground-speed sensor 58 detects the ground-speed, $V_{GS}$, of the vehicle as a running speed thereof relative to the road surface on which the vehicle is running. The ground-speed sensor 58 may be of a supersonic Doppler-effect type or of a spatial-filter type.

Figure 2:
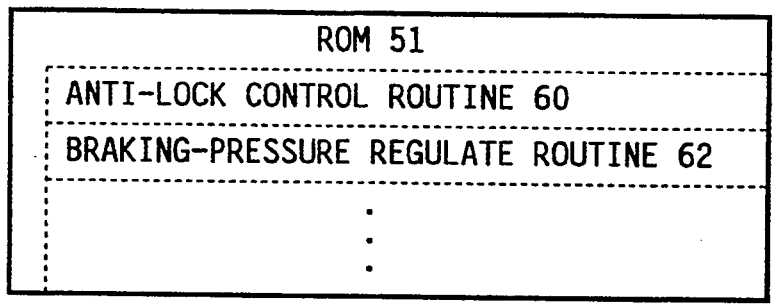
FIG. 2 is an illustrative view of control programs stored in a read only memory (ROM) of a computer of a controller of the control apparatus of FIG. 1.

As shown in FIG. 2, the ROM of the controller 50 stores, in advance, various control programs such as an anti-lock control routine 60 and a braking-pressure regulate routine 62. The CPU of the controller 50 implements those routines 60, 62 for operating each of the four solenoid-operated valves 20, 20, 24, 24 at a controlled duty cycle and thereby carrying out an anti-lock braking-pressure regulating operation (hereinafter, abbreviated to the "ALBP" regulating operation, when appropriate).

There will be described the ALBP regulating operation carried out by the present control apparatus. First, general explanation is provided below.

The present control apparatus judges whether or not it is necessary to start an ALBP regulating operation, by using an ALBP regulation starting judging rule. When the actual wheel speed $V_W$ of any one of the four wheels FL, FR, RL, RR detected by the corresponding wheel speed sensor 56 is reduced to a value not greater than a target wheel speed, $V_R$, the controller 50 judges that it is necessary to start an ALBP regulating operation. The target wheel speed $V_R$ is obtained by multiplying the ground-speed $V_{GS}$ of the vehicle by an appropriate slip coefficient, K, (e.g., 0.85 to 0.90). In the present embodiment, the slip coefficient K is commonly used for all the front and rear wheels FL, FR, RL, RR. However, it is possible to use different slip coefficients for the front wheels and the rear wheels, respectively, by taking into consideration the turning-around characteristics of the vehicle upon application of a braking force to the vehicle.

However, when the actual wheel speed $V_W$ of the wheel is greater than the target wheel speed $V_R$ and simultaneously when a time derivative, $G_W$, of the actual wheel speed $V_W$ of the wheel is smaller than a negative reference value, $G_1$ (e.g., $-1.5$ G), the controller 50 operates for holding the braking pressure applied to the wheel in question before commencement of the ALBP regulating operation (i.e., initial pressure-decrease mode). The reasons for the above control are as follows:

The tendency of locking of any of the wheels FL, FR, RL, RR is raised when the brake pedal 10 is abruptly depressed by the driver. However, the actual wheel speed $V_W$ of the wheel does not respond so well to the abrupt depression of the brake pedal 10 as the time derivative $G_W$ of the actual wheel speed $V_W$ of the wheel. If the controller 50 were adapted to detect excessive locking of the wheel based solely on the actual wheel speed $V_W$ of the wheel, therefore, the controller 50 would suffer from raised tendency of late starting of a braking pressure decreasing. Consequently the actual wheel speed $V_W$ of the wheel would excessively be reduced. Hence, in the case where the time derivative $G_W$ of the actual wheel speed $V_W$ of the wheel becomes smaller than the negative reference value $G_1$ even though the actual wheel speed $V_W$ of the wheel may still be greater than the target wheel speed $V_R$, there is possibility that the wheel in question be brought into locking on the road surface. Thus, in this case, the controller 50 holds in advance the braking pressure applied to the wheel (hereinafter, referred to as the "prior pressure-hold").

In the event that the brake pedal 10 is abruptly depressed by the driver when the vehicle is running on a road (e.g., a dry asphalt road) whose surface has a high friction coefficient, $\mu$, the provision of the above-described prior pressure-hold additionally produces the following advantages:

Upon depression of the brake pedal 10, the vehicle as a whole is subject to forward pitching. Consequently the vehicle is subject to forward movement of load and the front wheels FL, FR are subject to increased load. Upon abrupt depression of the brake pedal 10, however, the vehicle body does not respond so well as the increasing of the braking pressure applied to each of the front wheels. Therefore, the prior pressure-hold is provided before commencement of an ALBP regulating operation, waiting for the forward pitching of the vehicle, i.e., increasing of the load applied to each front wheel. Consequently the friction coefficient $\mu$ of the road surface with respect to each front wheel is raised and the amount of decrease of the time derivative $G_W$ of the actual wheel speed $V_W$ of each front wheel is effectively restrained. That is, the amount of decrease of the actual wheel speed $V_W$ of each front wheel is effectively restrained. In the pressure-decrease mode following the prior pressure-hold, therefore, the amount of decrease of the braking pressure is effectively restrained. That is, a higher braking pressure is kept for each front wheel, and an excessive amount of decrease of the braking pressure is avoided.

Figure 3:
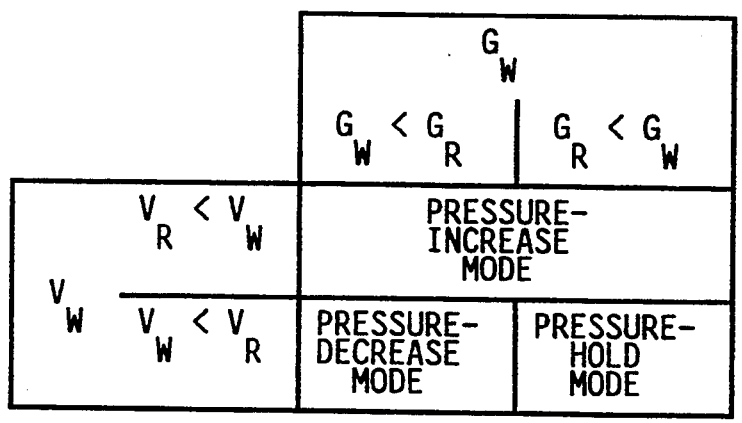
FIG. 3 is a table for explaining a mode selecting rule employed in the control apparatus of FIG. 1.

Meanwhile, the present control apparatus uses a braking-pressure regulate-mode selecting rule for carrying out the ALBP regulating operation. This rule is described in detail below by reference to FIG. 3.

When the actual wheel speed $V_W$ of any one of the four wheels FL, FR, RL, RR becomes smaller than the target wheel speed $V_R$, the controller 50 selects and implements the pressure-decrease mode, one of the three pressure-regulate modes, i.e., pressure-increase, pressure-decrease, and pressure-hold modes. If, as a result of implementation of the pressure-decrease mode, the actual wheel speed $V_W$ of the wheel in question becomes greater than the target wheel speed $V_R$ so as to approach close to the ground-speed $V_{GS}$ of the vehicle, the controller 50 selects and implements the pressure-increase mode. That is, the controller 50 selects an appropriate one of the three pressure-regulate modes based on a wheel speed error, $\Delta$, that is a deviation of the actual wheel speed $V_W$ of the wheel from the target wheel speed $V_R$. However, when the time derivative $G_W$ of the actual wheel speed $V_W$ of the wheel becomes greater than a time derivative, $G_R$, of the target wheel speed $V_R$ even though the actual wheel speed $V_W$ of the wheel may be smaller than the target wheel speed $V_R$, the controller 50 changes the pressure-decrease mode to the pressure-hold mode. The reasons for this control are as follows:

When the time derivative $G_W$ of the actual wheel speed $V_W$ of the wheel in question becomes equal to the time derivative $G_R$ of the target wheel speed $V_R$ because of the decreasing of the braking pressure applied to the wheel, it can be judged that the dynamic stability of rotation of the wheel has been established. In this situation, it is not necessary to further decrease the braking pressure applied to the wheel. Rather, excessive decrease of the braking pressure should be avoided.

Meanwhile, the previously-described conventional anti-lock braking-pressure control apparatus wherein a vehicle speed is estimated based on the actual wheel speeds of a plurality of wheels of a vehicle and an ALBP regulating operation is carried out based on the thus estimated vehicle speed, is adapted such that the pressure-decrease mode is continued until the time derivative $G_W$ of the actual wheel speed of a wheel in question is increased up to a positive reference value, $G_2$, even after the parameter $G_W$ has exceeded the time derivative of a target wheel speed as a result of the decreasing of the braking pressure. This amount of decrease of the braking pressure is slightly excessively large, because the actual wheel speed of the wheel in question is increased as close as possible to the actual running speed of the vehicle so as to improve the accuracy of estimation of the vehicle speed to the highest possible degree. In the present embodiment, however, the running speed of the vehicle is not estimated based on the actual wheel speeds $V_W$ of the wheels, but is obtained in terms of the ground-speed $V_{GS}$ which is measured with precision by the ground-speed sensor 58 independent of the slipping condition of the wheel in question. Therefore, the present control apparatus is free from the conventional requirement of the above-described excessive pressure decrease, and does not uselessly lose the braking force applied by the driver.

Figure 4:
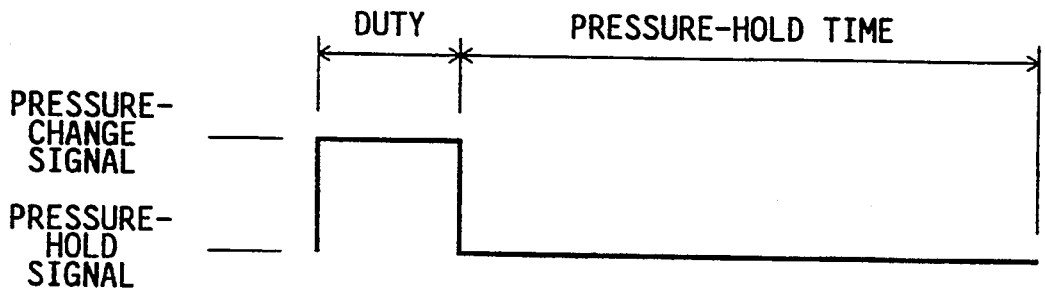
FIG. 4 is an illustrative view of electric signals produced by the controller for operating a solenoid-operated valve at a controlled duty cycle.

The controller 50 carries out an ALBP regulating operation by operating each of the four solenoid-operated valves 20, 20, 24, 24 at a controlled duty cycle or factor. The duty cycle is a ratio or percentage of a pressure-increase or pressure-decrease time with respect to the total cycle time additionally including a pressure-hold time following the pressure-increase or -decrease time. That is, as shown in FIG. 4, the duty cycle is a ratio of the time, DUTY, of lasting of a pressure-change (PC) signal (i.e., pressure-increase or pressure-decrease signal) with respect to a total cycle time additionally including the time of lasting of a pressure-hold (PH) signal following the PC signal. In the present embodiment, the time DUTY of a PC signal is variable while the time of lasting of a PH signal is constant. Therefore, the duty cycle is controllable by changing the time DUTY of a PC signal supplied to the solenoid of each of the valves 20, 20, 24, 24. Thus, in the present embodiment, the time DUTY serves as the duty cycle controlled by the controller 50. The duty cycle DUTY is determined such that a longer duty cycle DUTY corresponds to a greater wheel speed error $\Delta V$ or a greater time derivative, $\Delta G$, of the wheel speed error $\Delta V$. Consequently, as the wheel speed error $\Delta V$ or the time derivative $\Delta G$ of the wheel speed error $\Delta V$ becomes greater, the braking pressure applied to the wheel in question is increased or decreased with a greater gradient.

As emerges from the foregoing description, the timing of termination of a pressure-increase or -decrease mode is determined by summing the duty cycle DUTY of a PC signal and the time of lasting of a following PH signal. Meanwhile, the timing of termination of a pressure-hold mode is defined by the commencement of a following pressure-increase or -decrease mode.

In addition, the present control apparatus uses a duty-cycle determining rule or rules for implementing each of the pressure-increase and pressure-decrease modes. These rules are described in detail below by reference to FIG. 5.

For the pressure-decrease mode, the duty cycle DUTY is determined according to the following expression (1):

$$A \cdot (G_R - G_W) \tag{1}$$

The time derivative $\Delta G$ of the wheel speed error $\Delta V$ of the wheel in question is utilized, but the wheel speed error $\Delta V$ of the wheel is not used. If both of the two parameters $\Delta G$, $\Delta V$ were utilized, the gradient of decrease of the braking pressure applied to the wheel would be excessively great relative to the tendency of locking of the wheel, and the amount of decrease of the braking pressure would be more than necessary.

Figure 10:
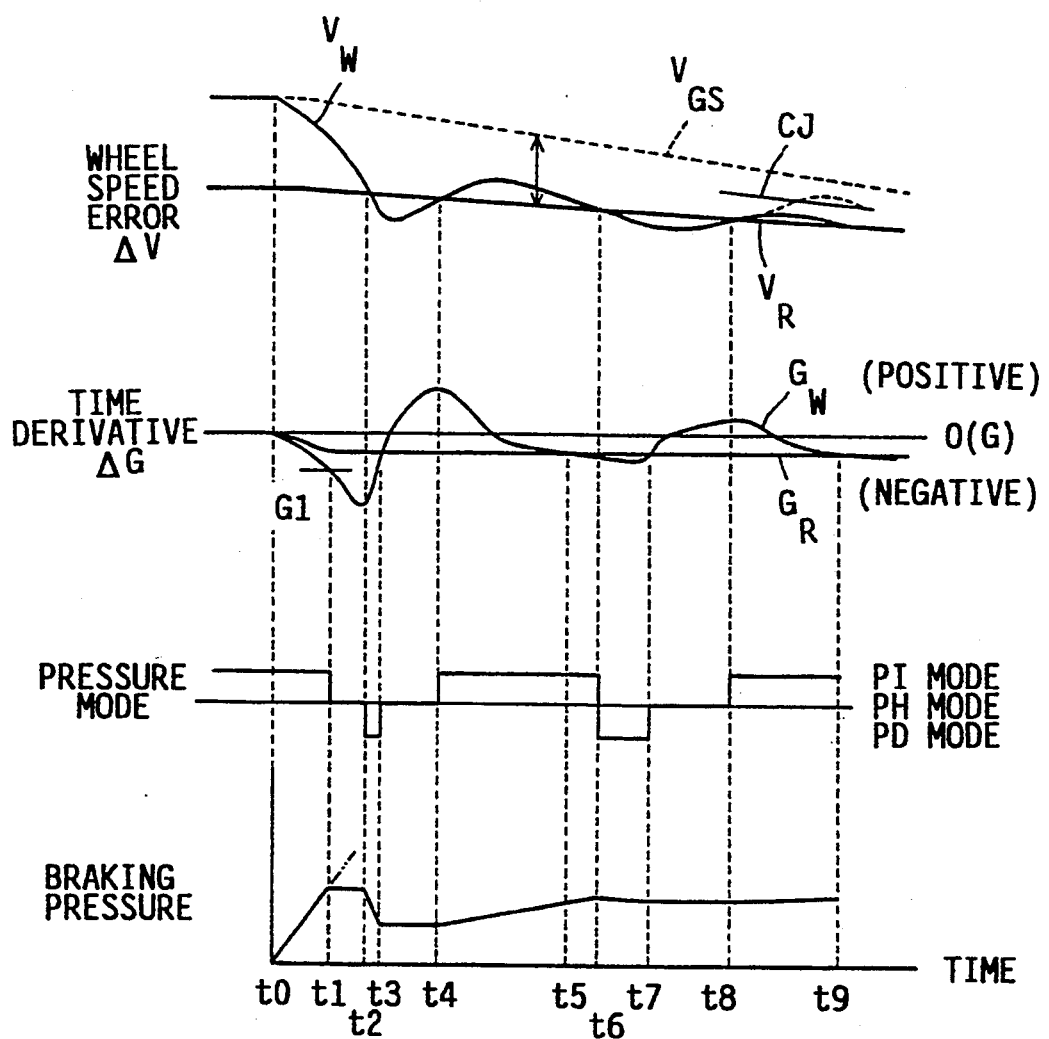
FIG. 10 is a graph showing an example of an antilock braking-pressure regulating operation carried out by the control apparatus of FIG. 1.

Regarding an example of an ALBP regulating operation shown in the graph of FIG. 10, the pressure-decrease mode is implemented from a time, $t_2$, to a time, $t_3$. During this time period, not only the time derivative $\Delta G$ of the wheel speed error $\Delta V$ of the wheel in issue but also the wheel speed error $\Delta V$ of the wheel indicate that the wheel tends to be locked. If, in this situation, the duty cycle DUTY were determined based on both the two parameters $\Delta G$, $\Delta V$, an excessively large duty cycle DUTY would be obtained, leading to a slightly excessive amount of decrease of the braking pressure applied to the wheel. In the present embodiment, therefore, the duty cycle DUTY is determined based solely on the parameter $\Delta G$.

Otherwise, the duty cycle DUTY may be determined with similar advantages based on the parameter $\Delta V$ alone. However, it is speculated that the parameter $\Delta G$ reflects the change of the slipping condition of the wheel more quickly than the parameter $\Delta V$. Therefore, the parameter $\Delta G$ is employed in the present embodiment Meanwhile, for the pressure-increase mode, two duty-cycle determining rules are employed; one for a first case where the time derivative $G_W$ of the actual wheel speed $V_W$ of the wheel in question is greater than the time derivative $G_R$ of the target wheel speed $V_R$ and the actual wheel speed $V_W$ of the wheel is approaching close to the ground-speed $V_{GS}$, and the other for a second case where the parameter $G_W$ becomes smaller than the parameter $G_R$ as a result of increasing of the braking pressure applied to the wheel. For the first case where the pressure increase is not sufficient, the following duty-cycle calculating expression (2) is used:

$$B\cdot(G_W-G_R)+C\cdot(V_W-V_R) \qquad (2)$$

For the second case where the pressure increase is sufficient and the parameter $G_W$ becomes smaller than the parameter $G_R$, the following expression (3) is used:

$$D\cdot(V_W-V_R) \qquad (3)$$

The reasons for the use of the two different duty-cycle determining rules (2), (3) are as follows:

Regarding the ALBP regulating operation shown in the graph of FIG. 10, the slipping condition of the wheel in question from a time, $t_4$, to a time, $t_5$, is such that the parameter $G_W$ is greater than the parameter $G_R$. During this time period, not only the time derivative $\Delta G$ of the wheel speed error $\Delta V$ of the wheel but also the wheel speed error $\Delta V$ of the wheel indicate that the braking pressure applied to the wheel is not sufficient. In this situation, the braking pressure should be increased quickly so as to reduce the actual wheel speed $V_W$ down to the target wheel speed $V_R$. Thus, the braking pressure is subjected to a "quick" pressure increase, by taking both of the two parameters $\Delta G$, $\Delta V$ into consideration. On the other hand, when the parameter $G_W$ becomes smaller than the parameter $G_R$, the dynamic stability of rotation of the wheel in question has been established. In this situation, the braking pressure should not be increased quickly for rapidly reducing the actual wheel speed $V_W$ to the target wheel speed $V_R$. Therefore, the braking pressure is subjected to a "slow" pressure increase, by taking the parameter $\Delta V$ alone into consideration.

When the parameter $G_W$ is smaller than the parameter $G_R$, the braking pressure applied to the wheel in issue tends to be insufficient. This is well reflected by the parameter $\Delta V$, but not by the parameter $\Delta G$ (e.g., from time $t_5$ to time $t_6$ in the graph of FIG. 10). Therefore, for this situation, the duty cycle DUTY is determined based on the parameter $\Delta V$ alone.

In the case where the parameter $G_W$ is smaller than the parameter $G_R$, the coefficient, D, of the above-indicated duty-cycle calculating expression (3) is changed depending upon whether or not a current degree of "convergence" of the actual wheel speed $V_W$ relative to the target wheel speed $V_R$ is sufficiently high. When the degree of convergence of the parameter $v_W$ to the parameter $V_R$ is sufficiently high, the coefficient D of the expression (3) is selected at a value, $D_1$, whereas, when the degree of convergence is not sufficiently high, the coefficient D of the expression (3) is selected at a value, $D_2$, greater than the value $D_1$. Therefore, in the event that the degree of convergence is sufficiently high, the duty cycle DUTY is determined at a "dull" value based on the wheel speed error $\Delta V$ and, in the event that the degree of convergence is not sufficiently high, the duty cycle DUTY is determined at a "sharp" value based on the same parameter $\Delta V$.

In the present embodiment, the controller 50 makes an affirmative judgment that the degree of convergence of the parameter $V_W$ to the parameter $V_R$ is sufficiently high, if the parameters $V_W$, $V_R$ satisfy the following expression (4)

$$(V_W-V_R)<(V_{GS}-V_R)/a \qquad (4)$$

where a is a constant (e.g., a=2).

If not, the controller 50 provides a negative judgement. In the graph of FIG. 10, a straight line, CJ, is drawn between a straight line representing the ground-speed $V_{GS}$ of the vehicle and a straight line representing the target wheel speed $V_R$. This straight line CJ serves as a "convergence judgment line". If the actual wheel speed $V_W$ of the wheel in issue is smaller than the convergence judgment line CJ, the controller 50 provides an affirmative judgement that the degree of convergence is sufficiently high; on the other hand, if the parameter $V_W$ is greater than the convergence judgment line CJ, the controller 50 makes a negative judgement that the degree of convergence is not sufficiently high.

As is apparent from the foregoing description, in the present embodiment, the slipping condition of each of the wheels FL, FR, RL, RR of the vehicle is estimated based on both the actual wheel speed $V_W$ of the wheel in question and the target wheel speed $V_R$. In a first case ("quick" pressure increase) where the parameter $V_W$ is greater than the parameter $V_R$ and simultaneously the time derivative $G_W$ of the parameter $V_W$ is greater than the time derivative $G_R$ of the parameter $V_R$, the duty cycle DUTY is determined based on both the wheel speed error $\Delta V$ and the time derivative $\Delta G$ of the parameter $\Delta V$. In a second case (pressure decrease) where the parameter $V_W$ is smaller than the parameter $V_R$ and simultaneously the parameter $G_W$ is smaller than the parameter $G_R$, the duty cycle DUTY is determined based on the parameter $\Delta G$. In a third case ("slow" pressure increase) where the parameter $V_W$ is greater than the parameter $V_R$ and simultaneously the parameter $G_W$ is smaller than the parameter $G_R$, the duty cycle DUTY is determined based on the parameter $\Delta V$.

While the ALBP regulating operation carried out by the present control apparatus has generally been described above, this operation is carried out according to the anti-lock control routine 60 stored in the ROM 51 of the controller 50. The anti-lock control routine 60 is represented by the flow chart of FIG. 6. The ROM 51 additionally stores the braking-pressure regulate routine 62, not shown in the drawings. The CPU of the controller 50 utilizes the braking-pressure regulate routine 62 for (a) monitoring various commands (given in the form of flags) and duty-cycle data DUTY which are stored in the RAM 52 (FIG. 11) by the CPU according to the anti-lock control routine 60, and subsequently (b) supplying an appropriate control signal to each of the four solenoid-operated valves 20, 20, 24, 24 for operating each valve at a controlled duty cycle.

Figure 6:
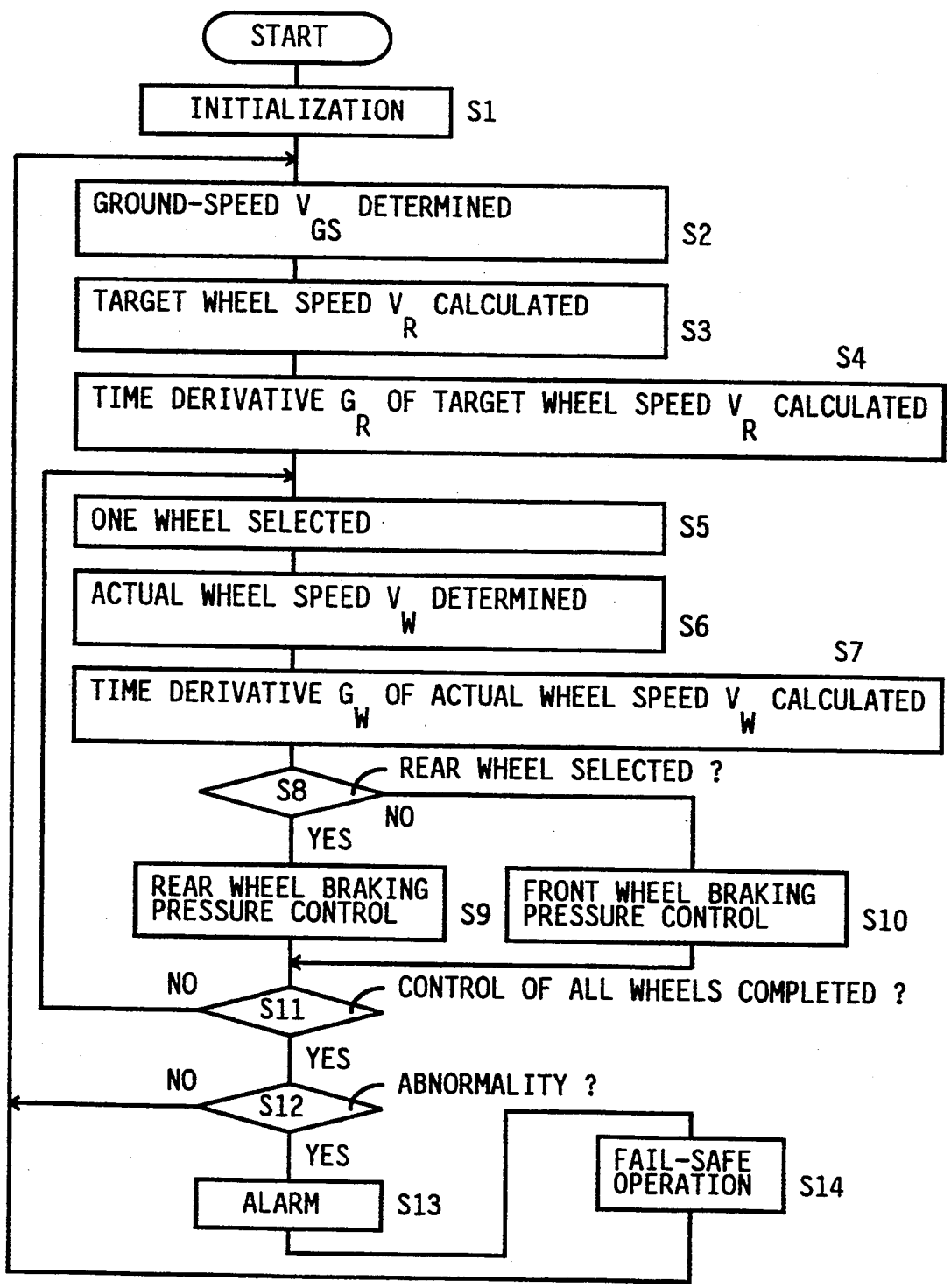
FIG. 6 is a flow chart representing an anti-lock control routine implemented by the computer of the controller.

Hereinafter, there will be described in detail the anti-lock control routine 60 by reference to the flow chart of FIG. 6 and the example shown in FIG. 10.

Figure 11:
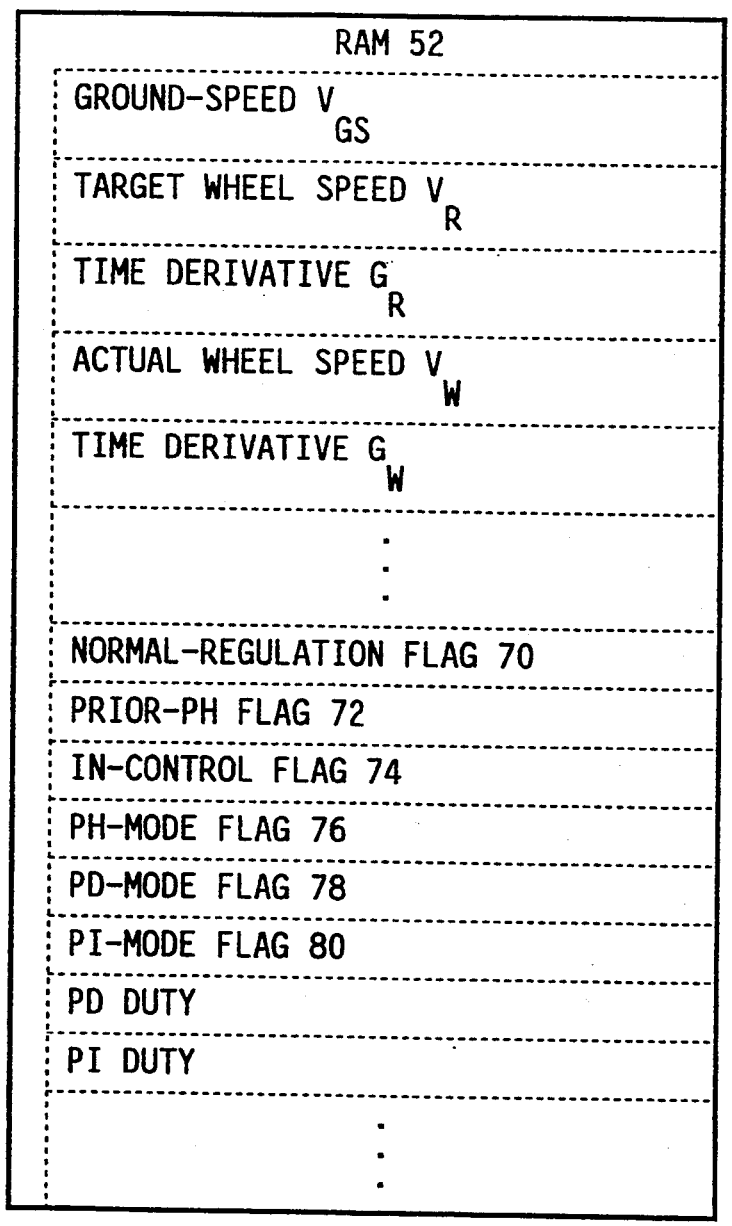
FIG. 11 is an illustrative view of various data stored in a random access memory (RAM) of the computer of the controller and various flags provided in the RAM.

Various flags, as shown in FIG. 11, are used for implementing the anti-lock control routine 60. A group of flags 70, 72, 74, 76, 78, 80 are provided in the RAM 52, for each of the four wheels FL, FR, RL, RR of the vehicle. Specifically described, the normal-regulation flag 70 is provided for regulating the braking pressure applied to the corresponding wheel faithfully according to the braking force exerted to the brake pedal 10 by the driver. When the normal-regulation flag 70 is set to "ON", the flag 70 indicates a command to supply a pressure-increase (PI) signal to the corresponding solenoid-operated valve 20, 24. The prior-PH flag 72 is provided for holding the braking pressure applied to the corresponding wheel before starting of an ALBP regulating operation. When the prior-PH flag 72 is set to "ON", the flag 72 indicates a command to supply a pressure-hold (PH) signal to the corresponding solenoid-operated valve 20, 24. The in-control flag 74 is provided for indicating whether or not the ALBP regulating operation has been started. When the in-control flag 74 is set to "ON", the flag 74 indicates that an ALBP regulating operation has been started. The PH-mode flag 76, PD-mode flag 78, and PI-mode flag 80 are used in an ALBP regulating operation as described in detail later. When the PH-mode, PD-mode, and PI-mode flags 76, 78, 80 are set to "ON", those flags indicate respective commands to supply a PH signal, a pressure-decrease (PD) signal, and a pressure-increase (PI) signal to the corresponding solenoid-operated valve 20, 24.

Upon application of electric power to the computer of the controller 50, all the flags 70 to 80 are reset to "OFF". Each of the flags 70, 72, 78, 80 is also reset to "OFF" each time it is checked by the CPU according to the braking-pressure regulate routine 62. The flag 76 is also reset to "OFF" when the flag 78 or the flag 80 is also set to "ON". Each of the flags 76, 78, 80 is reset to "OFF" when the flag 74 is reset to "OFF".

Next, the anti-lock control routine 60 is described in detail by reference to FIG. 6.

This routine is implemented repetitively, e.g., in a plurality of periodic control cycles. In each control cycle, first, an initialization is effected at Step S1. For example, all numerical data (e.g., duty cycles DUTY) stored in the RAM 52 are cleared and all the flags 70 to 80 provided in the RAM 52 are reset to "OFF". Step S1 is followed by Step S2 at which a current ground-speed $V_{GS}$ of the vehicle is determined based on an output signal supplied from the ground-speed sensor 58, and the determined ground-speed $V_{GS}$ is stored in an appropriate area of the RAM 52 as shown in FIG. 11. At the following Step S3, a target wheel speed $V_R$ is obtained by multiplying the ground-speed $V_{GS}$ by the previously described appropriate slip coefficient K, and the obtained target wheel speed $V_R$ is stored in the RAM 52. Step S3 is followed by Step S4 at which the target wheel speed $V_R$ is differentiated with respect to time, for obtaining a time derivative $G_R$ of the target wheel speed $V_R$. Specifically, the time derivative $G_R$ is obtained by subtracting, from the current value of the target wheel speed $V_R$, the prior value of the same parameter $V_R$ which had been determined in the preceding control cycle and stored in the RAM 52. The obtained value of the parameter $G_R$ is stored in the RAM 52.

Subsequently, a loop of Steps S5 through S10 is repetitively effected for each of the front-right, front-left, rear-right, and rear-left wheels FR, FL, RR, RL in the order of description. At Step S5, therefore, the CPU of the computer of the controller 50 selects an appropriate one of the four wheels to be dealt with in a current cycle. Step S5 is followed by Step S6 at which an actual wheel speed $V_W$ is determined based on an output signal supplied from the wheel speed sensor 56 corresponding to the wheel selected at Step S5 (hereinafter, referred to as the "current" wheel). The determined actual wheel speed $V_W$ of the current wheel is stored in the RAM 52. At the following Step S7, the actual wheel speed $V_W$ is differentiated with respect to time, for obtaining a time derivative $G_W$ of the actual wheel speed $V_W$. Specifically, the time derivative $G_W$ is obtained by subtracting, from the current value of the actual wheel speed $V_W$, the prior value of the same parameter $V_W$ which had been determined in the preceding control cycle and stored in the RAM 52. The obtained value of the parameter $G_W$ is stored in the RAM 52.

Step S7 is followed by Step S8 at which the CPU judges whether or not the current wheel is one of the two rear wheels RR, RL. In the present embodiment, different duty-cycle determining subroutines are employed for the front wheels FR, FL and the rear wheels RR, RL, respectively. Therefore, in the case where the current wheel is one of the rear wheels, the control of the CPU proceeds with Step S9 and, in the case where the current wheel is one of the front wheels, the control of the CPU proceeds with Step S10. Steps S9 and S10 will be described later.

After the implementation of Step S9 or Step S10 has been completed, the control of the CPU goes to Step S11 at which the CPU judges whether or not the loop of Steps S5 to S10 has been completed for each of the four wheels FR, FL, RR, RL. Assuming that the loop of Steps S5 to S10 has not been completed for all the wheels, a negative judgment is made at Step S11. In this case, the control of the CPU goes back to Step S5 at which the CPU selects the next one of the four wheels in the above-indicated order so that Steps S6 to S10 are carried out for the selected wheel. Meanwhile, when the loop of Steps S5 to S10 has been completed for all the four wheels, an affirmative judgment is made at Step S11, and the control of the CPU goes to Step S12 at which the CPU judges whether or not an abnormality has occurred to the present control apparatus, based on self-diagnosis signals supplied from various sensors used in the control apparatus. For example, when an electric short has occurred to any one of the solenoid-operated valves 20, 20, 24, 24, a sensor corresponding to the valve in issue supplies the CPU with a self-diagnosis signal indicative of that abnormality. If no abnormality has occurred, a negative judgment is made at Step S12, and the control of the CPU goes back to Step S2. On the other hand, if an abnormality has occurred, an affirmative judgment is made at Step S12, and the control of the CPU proceeds with Step S13 at which the CPU activates an alarm device (not shown) to inform the driver of the occurrence of the abnormality. Step S13 is followed by Step S14 at which the CPU effects a fail-safe treatment. For example, the CPU makes the present control apparatus dead or inoperative, and informs the driver of that treatment. After completion of Step S14, the control of the CPU goes back to Step S2.

Next, Step S9 and Step S10 are described in detail.

Figure 7:
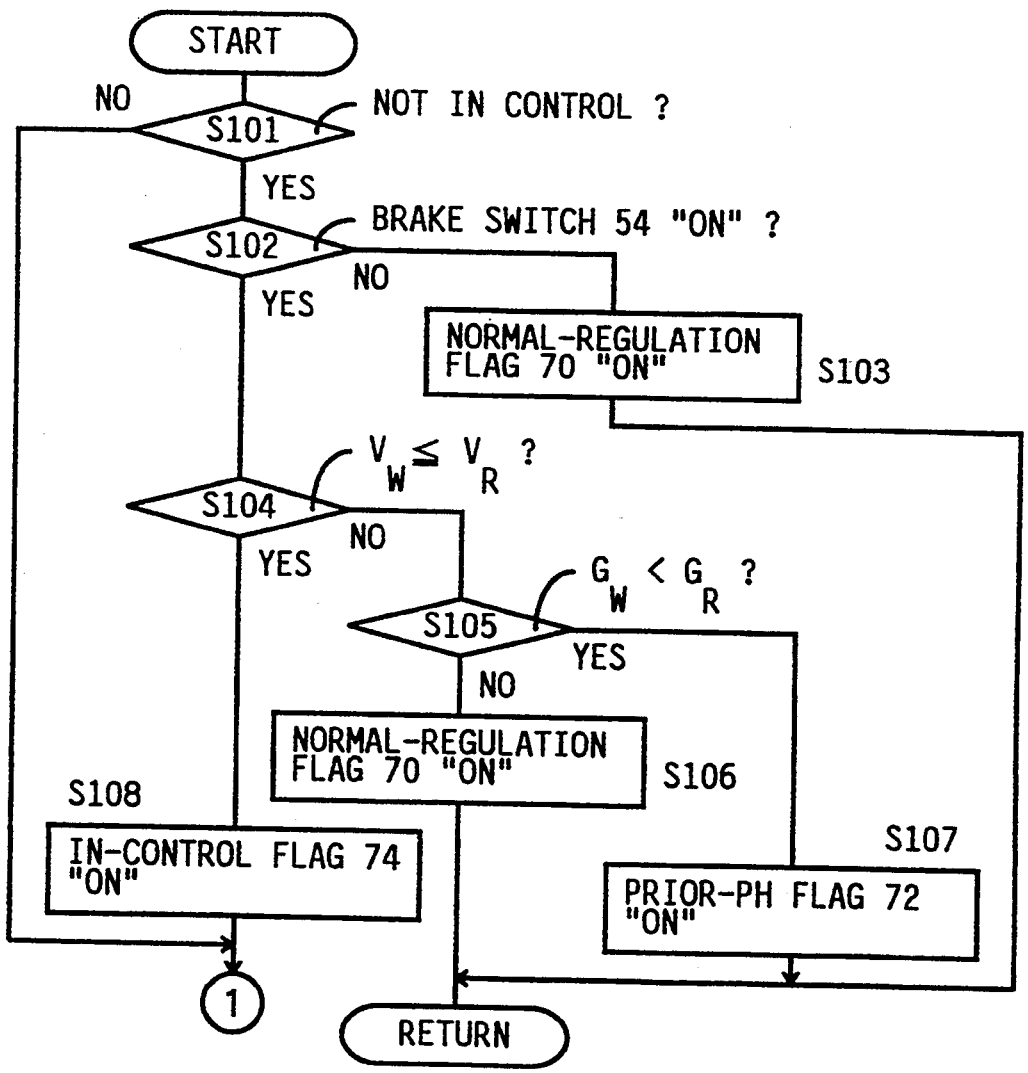
FIG. 7 is a flow chart representing a portion of a subroutine serving as Step S9 or Step S10 of the flow chart of FIG. 6.
Figure 8:
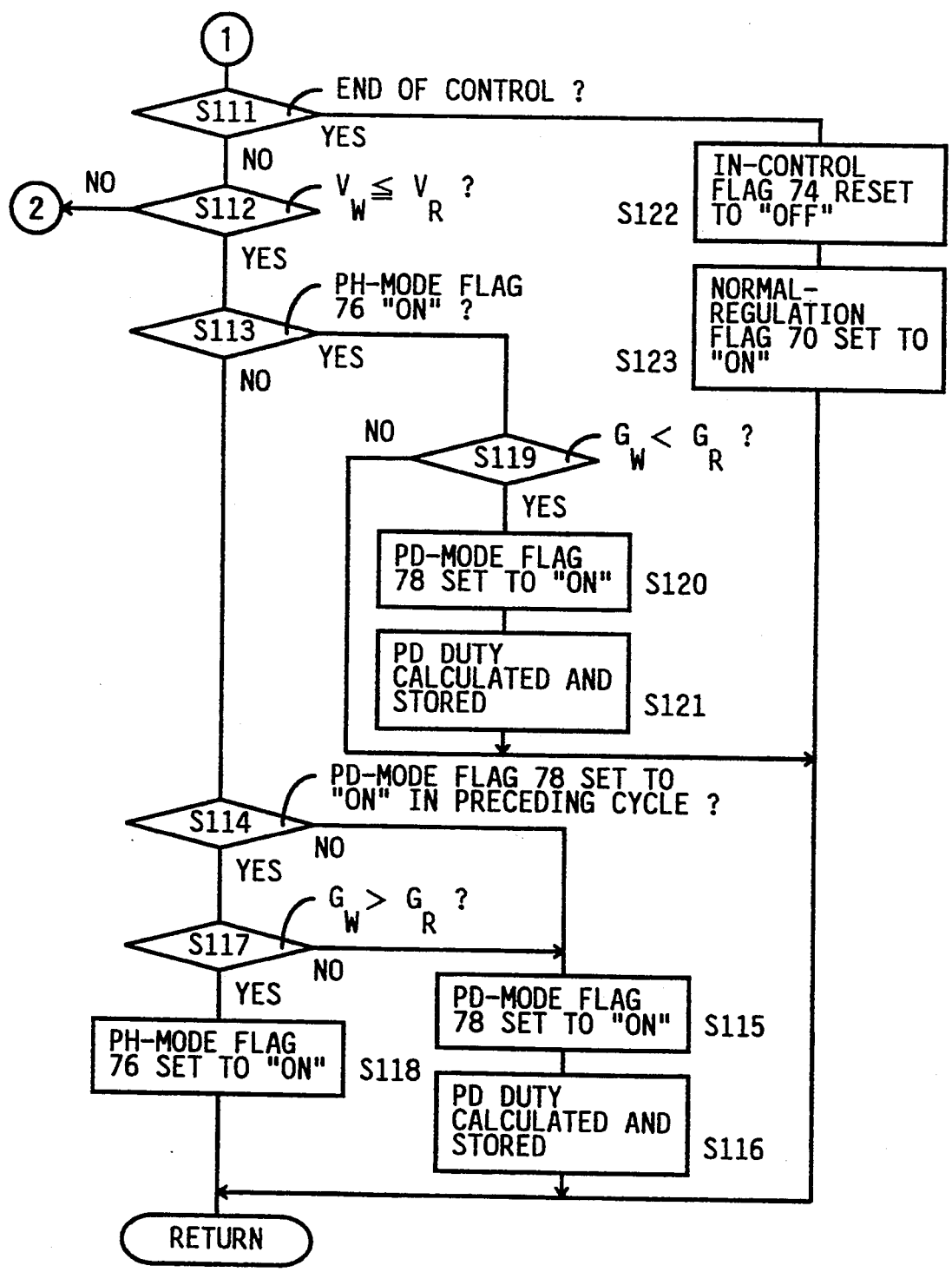
FIG. 8 is a flow chart representing another portion of the same subroutine.
Figure 9:
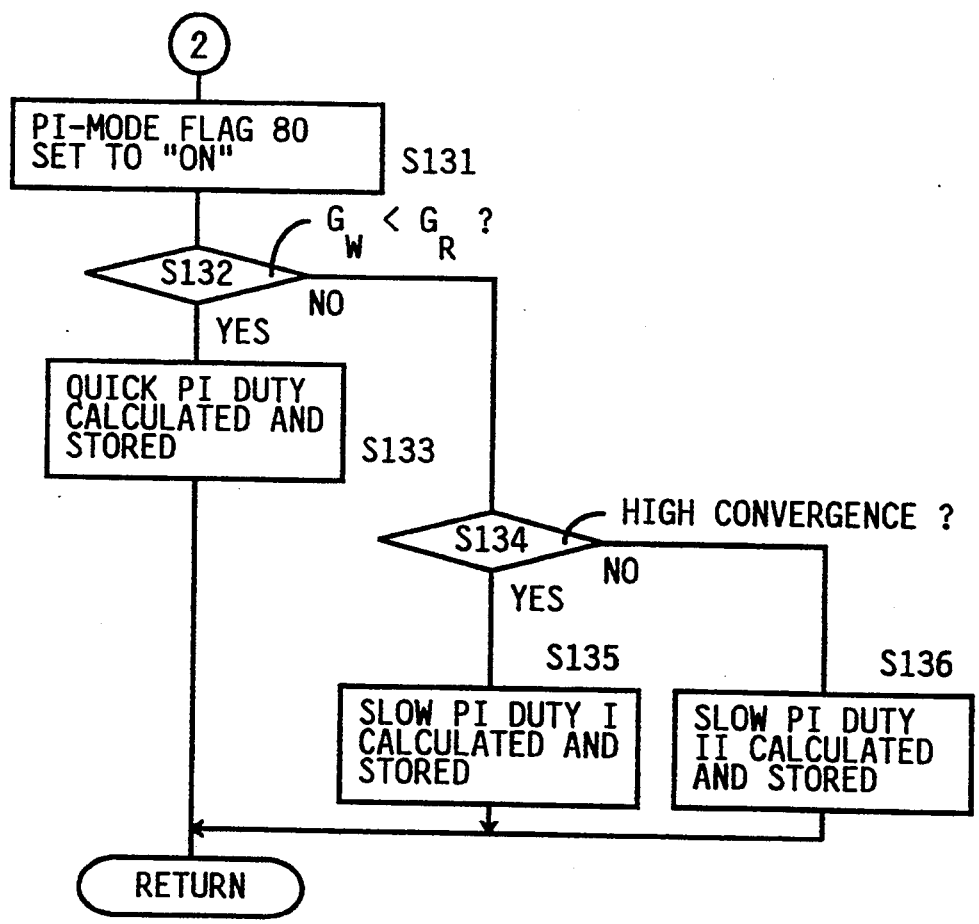
FIG. 9 is a flow chart representing yet another portion of the same subroutine.

Step S9 is provided for effecting the so-called "low-select" control for the two rear wheels RR, RL, while Step S10 is provided for effecting the so-called "independent" control for the two front wheels FR, FL. Under the independent control, a plurality of wheels are respectively subject to independent controls selected based on respective conditions or parameter of the wheels. The low-select control is one of "dependent" controls wherein a plurality of wheels are subject to a common control selected based on the conditions or parameters of all the wheels. Thus, Steps S9 and S10 are provided for effecting different sorts of controls. However, many basic steps are common to the two manners of control. Hence, the independent control effected at Step S10 for the front wheels will be described in detail below by reference to the flow charts of FIGS. 7 to 9, and description of the low-select control effected at Step S9 for the rear wheels is omitted. Hereinafter, a group of steps shown in each of the three flow charts of FIGS. 7 to 9 is referred to as a "subroutine". In the following description, attention is focused on one (referred to as the "current wheel") of the two front wheels which is controlled, in the course of time, according to the three subroutines of FIGS. 7 to 9.

First, at Step S101 of the first subroutine of FIG. 7, the CPU of the computer of the controller 50 judges, based on the in-control flag 74 of the RAM 52, whether or not an ALBP regulating operation has been started for the current wheel. Since the current control cycle is an initial cycle after the application of electric power to the computer of the controller 50 and therefore immediately after the in-control flag 74 has been reset to "OFF" at Step S1, an affirmative judgment is made in Step S101.

When an affirmative judgment is made in Step S101, the control of the CPU proceeds with Step S102 at which the CPU judges whether or not the brake switch 54 has been set to "ON", i.e., whether or not the braking force has been applied to the brake pedal 10 by the driver. Assuming that at this point of time the braking force has not been applied to the brake pedal 10, a negative judgment is made in Step S102, and the control goes to Step S103 at which the CPU sets the normal-regulation flag 70 of the RAM 52 to "ON". Thus, the brake system of the vehicle is placed in such a situation that, when the previously-described braking-pressure regulate routine 62 is implemented, the braking pressure applied to the wheel in question can be regulated in proportion to the braking force exerted to the brake pedal 10 by the driver. In this way, one cycle of this subroutine is ended.

On the other hand, assuming that the braking force has been exerted to the brake pedal 10 by the driver and therefore the brake switch 54 has been set to "ON", an affirmative judgment is made at Step S102, and the control of the CPU goes to Step S104 at which the CPU judges whether or not the actual wheel speed $V_W$ of the current wheel is equal to, or smaller than, the target wheel speed $V_R$. In other words, the CPU judges whether or not the current wheel is excessively slipping on the road surface. Assuming that at this point of time the current wheel is not excessively slipping (e.g., time $t_0$ to time $t_1$ in the graph of FIG. 10), a negative judgment is made at Step S104, and the control goes to Step S105 at which the CPU judges whether or not the time derivative $G_W$ of the actual wheel speed $V_W$ of the current wheel is reduced to a value smaller than the previously-described reference value $G_1$. In other words, the CPU judges whether or not the current wheel tends to be locked on the road surface. Assuming that at this point of time the tendency of locking of the current wheel is not high, a negative judgment is made at Step S105, and the control goes to Step S106 at which the CPU sets the normal-regulation flag 70 of the RAM 52 to "ON". On the other hand, assuming that the parameter $G_W$ of the current wheel is reduced to a value smaller than the reference value $G_1$ (e.g., time $t_1$ in FIG. 10), a positive judgment is made in Step S105, and the control goes to Step S107 at which the CPU sets the prior-PH flag 70 of the RAM 52 to "ON". In the latter case, the brake system of the vehicle is placed in such a situation that, when the previously-described braking-pressure regulate routine 62 is implemented, the braking pressure applied to the wheel in question is held unchanged irrespective of increasing of the braking force exerted to the brake pedal 10. In either case, one cycle of this subroutine is ended.

Assuming that, while Steps S101, S102, S104, and S105 and either one of Steps S106 and S107 are repetitively effected, the braking force exerted to the brake pedal 10 becomes excessively high relative to the friction coefficient $\mu$ of the road surface and therefore the current wheel is excessively slipping on the road surface, i.e., assuming that the actual wheel speed $V_W$ of the current wheel is reduced to a value equal to, or smaller than, the target wheel speed $V_R$ (e.g., time $t_2$ in FIG. 10), a positive judgment is made in Step S104, and the control goes to Step S108 at which the CPU sets the in-control flag 74 to "ON", and proceeds with the second and third subroutines of FIGS. 8 and 9 for starting an ALBP regulating operation for the current wheel.

At Step S111 of the second subroutine of FIG. 8, the CPU judges whether or not it is unnecessary to continue the ALBP regulating operation, i.e., whether or not it is necessary to end the ALBP regulating operation. For example, the CPU judges whether or not the brake pedal 10 has been released from the foot of the driver and therefore the brake switch 54 has been reset to "OFF", and whether or not the ground-speed $V_{GS}$ of the vehicle has been reduced to a value smaller than a control-end reference value (e.g., 5 km/h). Based on these judgements, the CPU makes a positive or negative judgment at Step S111. Since the current control cycle is immediately after a positive judgment at Step S104 that an ALBP regulating operation is necessary, a negative judgment is made at Step S111, and the control of the CPU goes to Step S112.

At Step S112, the CPU judges whether or not the actual wheel speed $V_W$ of the current wheel is equal to, or smaller than, the target wheel speed $V_R$. Since the current cycle of the second subroutine is the first or initial cycle after a positive judgment has been made at Step S104 of the first subroutine of FIG. 7, the same, i.e., positive judgment is made at Step S112. Although this step may appear to be a useless step, the step is necessary because Step S104 is skipped in each of the second and subsequent cycles of the second subroutine after the positive judgment at Step S104. Since in the current cycle it is assumed that the actual wheel speed $V_W$ of the current wheel is equal to, or smaller than, the target wheel speed $V_R$, a positive judgement is made at Step S112, and the control of the CPU goes to Step S113 at which the CPU judges whether or not the pressure-hold (PH) mode is continuing, i.e., whether or not the PH-mode flag 76 is in the "ON" position. Since in the current cycle the PH-mode flag 76 has been reset to "OFF" at Step S1, a negative judgment is made at Step S113, and the control of the CPU goes to Step S114.

At Step S114, the CPU judges whether or not the PD-mode flag 78 had been set to "ON" at Step S115 or Step S121 in the preceding control cycle. Since it is not the case with the current control cycle, a negative judgment is made in Step S114, and the control of the CPU proceeds with Step S115 at which the CPU sets the PD-mode flag 78 to "ON". Step S115 is followed by Step S116 at which the CPU calculates a duty cycle DUTY for the pressure-decrease (PD) mode (hereinafter, referred to as the "PD DUTY"). The PD DUTY is obtained by using the previously-described expression (1). The obtained PD DUTY is stored in an appropriate area of the RAM 52 as shown in FIG. 11. Therefore, when the braking-pressure regulate routine 62 is implemented, the PD mode is started for decreasing the braking pressure applied to the current wheel (e.g., from time $t_2$ to time $t_3$ in FIG. 10). Thus, one cycle of the second subroutine is ended.

When Step S101 of the first subroutine of FIG. 7 is effected in the following control cycle, a negative judgment is made at this step because the in-control flag 74 had been set to "ON" at Step S108 in the preceding control cycle as described above. Therefore, all the other steps of the first subroutine are skipped and the control of the CPU goes to Step S111 of the second subroutine of FIG. 8. Assuming that at this point of time it is necessary to continue the ALBP regulating operation, a negative judgment is made at Step S111, and the control proceeds with Step S112 to judge whether or not the actual wheel speed $V_W$ of the current wheel is still equal to or smaller than the target wheel speed $V_R$. Assuming that a positive judgement is made at Step S112, a negative judgment is made at Step S113 because the PH-mode flag 76 had not been set to "ON" in the preceding control cycle. Thus, the control of the CPU goes to Step S114, and a positive judgment is made at this step because the PD-mode flag 78 had been set to "ON" at Step S115 in the preceding control cycle. Therefore, the control of the CPU goes to Step S117 at which the CPU judges whether or not the time derivative $G_W$ of the actual wheel speed $V_W$ of the current wheel has exceeded the time derivative $G_R$ of the target wheel speed $V_W$. In other words, the CPU judges whether or not the tendency of locking of the current wheel has begun to reduce. Assuming that at this point of time that tendency has not begun to reduce, a negative judgment is made at Step S117, and the control goes to Step S115 so as to implement the PD mode again. On the other hand, assuming that the above tendency has begun to reduce and therefore the parameter $G_W$ has exceeded the parameter $G_R$ (e.g., time $t_3$ in FIG. 10), a positive judgment is made at Step S117, and the control goes to Step S118 at which the CPU sets the PH-mode flag 76 to "ON". That is, the PD mode is changed to the PH mode. Thus, one cycle of this subroutine is ended.

When Step S113 of the second subroutine of FIG. 8 is effected again in the next control cycle, a positive judgment is made at this step because the PH-mode flag 76 had been set to "ON" at Step S118 in the preceding control cycle as described above. Therefore, the control of the CPU goes to Step S119 at which the CPU judges whether or not the time derivative $G_W$ of the actual wheel speed $V_W$ of the current wheel become smaller than the time derivative $G_R$ of the target wheel speed $V_W$. In other words, the CPU judges whether or not the time of lasting of the pressure-decrease regulation was insufficient and therefore the tendency of locking of the current wheel has begun to raise. Assuming that at this point of time that tendency has not begun to raise, a negative judgment is made at Step S119, and one cycle of this subroutine is ended. Thus, the PH-mode flag 76 is not reset to "OFF" in the current control cycle. That is, the PH mode is continued.

On the other hand, assuming that the time derivative $G_W$ of the actual wheel speed $V_W$ of the current wheel become smaller than the time derivative $G_R$ of the target wheel speed $V_W$, a positive judgment is made at Step S119, and the control of the CPU goes to Step S120 at which the CPU sets the PD-mode flag 78 to "ON", and subsequently to Step S121 at which the CPU calculates a PD DUTY in the same manner as described for Step S116. The thus obtained PD DUTY is stored in the RAM 52. The PH mode is changed to the PD mode, for ensuring that the tendency of locking of the current wheel is restrained. Thus, one cycle of the second subroutine is ended.

Assuming that, while the PD mode and the PH mode are implemented as described, the tendency of locking of the current wheel is sufficiently reduced, i.e., the actual wheel speed $V_W$ of the current wheel has exceeded the target wheel speed $V_W$ (e.g., time $t_4$ in FIG. 10), a negative judgment is made at Step S112, and the control of the CPU goes to Step S131 of the third subroutine of FIG. 9.

At Step S131, the CPU sets of the PI-mode flag 80 to "ON". Step S131 is followed by Step S132 at which the CPU judges whether or not the time derivative $G_W$ of the actual wheel speed $V_W$ of the current wheel is greater than the time derivative $G_R$ of the target wheel speed $V_W$. Assuming that at this point of time the parameter $G_W$ is greater than the parameter $G_R$, a positive judgment is made at Step S132, and the control goes to Step S133 at which the CPU calculates a duty cycle DUTY for the previously-described "quick" pressure increase according to the pressure-increase (PI) mode (hereinafter, referred to as the "quick PI DUTY"). The quick PI DUTY is obtained by using the previously-described expression (2). Thus, one cycle of this subroutine is ended.

Assuming that, while the "quick" pressure increase is repetitively carried out, the time derivative $G_W$ of the actual wheel speed $V_W$ of the current wheel becomes smaller than the time derivative $G_R$ of the target wheel speed $V_W$ (e.g., time $t_5$ in FIG. 10), a negative judgment is made at Step S132, and the control goes to Step S134 at which the CPU judges whether or not the degree of "convergence" of the actual wheel speed $V_W$ of the current wheel relative to the target wheel speed $V_W$ is sufficiently high. Specifically, the CPU judges whether or not the actual wheel speed $V_W$ and the target wheel speed $V_W$ satisfy the previously-described expression (4). Assuming that the degree of "convergence" is sufficiently high, a positive judgment is made at Step S134, and the control of the CPU goes to Step S135 at which the CPU calculates a duty cycle DUTY for the previously-described first case of the "slow" pressure increase according to the PI mode (hereinafter, referred to as the "slow PI DUTY I"). The slow PI DUTY I is obtained by using the following expression (5):

$$\text{slow PI DUTY I} = D_1 \cdot (V_W - V_R) \tag{5}$$

On the other hand, assuming that at this point of time the degree of "convergence" is not sufficiently high, a negative judgment is made at Step S134, and the control of the CPU goes to Step S136 at which the CPU calculates a duty cycle DUTY for the previously-described first case of the "slow" pressure increase according to the PI mode (hereinafter, referred to as the "slow PI DUTY II"). The slow PI DUTY II is obtained by using the following expression (5):

$$\text{slow PI DUTY II} = D_2 \cdot (V_W - V_R) \quad (5)$$

Thus, in either case, one cycle of this subroutine is ended.

Basically, the PD mode, PH mode, and PI mode are carried out in this order as a unit of control and, while this unit is repeated, the actual wheel speed $V_W$ comes to follow the target wheel speed $V_R$ with high accuracy. That is, the vehicle is effectively braked by utilizing the friction coefficient $\mu$ of the road surface on which the vehicle is running.

Meanwhile, when the brake pedal 10 is released from the foot of the driver, or when the ground-speed $V_{GS}$ of the vehicle becomes smaller than a reference value, a positive judgment is made at Step S111 of the second subroutine of FIG. 8, and the control of the CPU goes to Step S122 at which the CPU resets the in-control flag 74 to "OFF". Step S122 is followed by Step S123 at which the CPU sets the normal-regulation flag 70 to "ON". Thus, one cycle of the second subroutine is ended.

AS is apparent from the foregoing description, in the present embodiment, the slipping condition of each of the four wheels FL, FR, RL, RR upon application of the braking force of the driver through the brake pedal 10, is estimated based on the actual wheel speed $V_W$ and the time derivative $G_W$ of the parameter $V_W$, and an appropriate one of the different duty-cycle determining rules is selected based on the estimated slipping condition. Therefore, a duty cycle of the solenoid-operated valve 20, 20, 24, 24 corresponding to the wheel in question is determined at an optimum value in relation to the current slipping condition of the wheel. Thus, an excessive amount of change or regulation of the braking pressure applied to the wheel is effectively avoided, so that an anti-lock braking-pressure regulating operation is carried out with sufficiently high accuracy.

In the present embodiment, Steps S116 and S121 of the flow chart of FIG. 8 and Steps S133, S135 and S136 of the flow chart of FIG. 9, and a portion of the computer of the controller 50 for implementing those steps, cooperate with each other to serve as the duty-cycle determining means of the anti-lock braking-pressure control apparatus.

While the present invention has been described in detail in one preferred embodiment thereof, the present invention may otherwise be embodied.

For example, in the illustrated embodiment, a constant pressure-hold time is provided following a changeable duty time DUTY in a total cycle time. That is, the duty cycle that is a ratio or percentage of the duty time DUTY to the total cycle time is changeable by changing the duty time DUTY. Alternatively, it is possible to change the duty cycle by employing a constant duty time and a changeable pressure-hold time following the duty time, and changing the pressure-hold time.

While, in the illustrated embodiment, the target wheel speed $V_R$ is obtained by multiplying the ground-speed $V_{GS}$ by an appropriate slip coefficient K, it is possible to obtain the target wheel speed $V_R$ by subtracting an appropriate value from the ground-speed $V_{GS}$.

Although, in the illustrated embodiment, each of the solenoid-operated valves 20, 20, 24, 24 is constituted by a pair of two-position valves, each valve may be constituted by a single three-position valve. Additionally, while each of the valves 20, 20, 24, 24 used in the illustrated embodiment is of a position-switchable type wherein the manner of hydraulic fluid communication among the master cylinder 14, corresponding wheel cylinder 22, 22, 26, 26, and corresponding fluid reservoir 30, 32 is changeable by switching the valve between two or more positions, each valve may be replaced by a valve of a linear-controllable type wherein a fluid pressure and an electromagnetic force are applied to a spool member in opposite directions such that the pressure and the force balance with each other on the spool member. In the latter case, the braking pressure applied to the wheel in question is changeable in a linear relationship with the electromagnetic force applied to the spool member.

It is to be understood that the present invention may be embodied with other changes, improvements, and modifications that may occur to those skilled in the art without departing from the scope and spirit of the invention defined in the appended claims.

What is claimed is:

1. An anti-lock braking-pressure control apparatus for a vehicle having a plurality of wheels, comprising:
   at least one wheel speed sensor which detects respective actual speeds of the wheels of the vehicle;
   at least one solenoid-operated valve which regulates respective braking pressures applied to the wheels;
   a ground-speed sensor which detects a ground-speed of the vehicle as a running speed thereof relative to a road surface; and
   a controller which electrically operates, for preventing locking of each of the wheels, a corresponding one of said at least one solenoid-operated valve at a controlled duty cycle,
   said controller comprising:
      rule selecting means for selecting one of a plurality of duty-cycle determining rules wherein said duty cycle is determined based on at least one of (a) a wheel speed error that is a deviation of said actual speed of said each wheel from a target wheel speed obtained based on said ground-speed of the vehicle and (b) a time derivative of said wheel speed error, said plurality of duty-cycle determining rules comprising (A) a first determining rule wherein said duty cycle is determined based on both (a) said wheel speed error, and (b) said time derivative of said wheel speed error, and (B) a second determining rule wherein said duty cycle is determined based on one of (a) said wheel speed error and (b) said time derivative of the wheel speed error;
      duty-cycle determining means for determining the duty cycle of said corresponding one solenoid-operated valve according to the selected one duty-cycle determining rule; and
      solenoid-operated valve operating means for operating said corresponding one solenoid-operated valve at the determined duty cycle to regulate the braking pressure applied to said each of the wheels.

2. A control apparatus according to claim 1, wherein said rule selecting means of said controller comprises means for estimating a slipping condition of said each wheel based on at least one of said actual speed of said each wheel and a time derivative of said actual speed of said each wheel, and selecting one of said plurality of duty-cycle determining rules based on the estimated slipping condition of said each wheel.

3. A control apparatus according to claim 2, wherein said rule selecting means selects said first determining rule from said plurality of duty-cycle determining rules, and said duty-cycle determining means determines, according to said first determining rule, the duty cycle of said corresponding one solenoid-operated valve for increasing the braking pressure applied to said each wheel.

4. A control apparatus according to claim 2, wherein said rule selecting means selects, from said plurality of duty-cycle determining rules, said second determining rule wherein the duty cycle of said corresponding one solenoid-operated valve is determined based on (a) said wheel speed error, and said duty-cycle determining means determines, according to said second determining rule, said duty cycle of said corresponding one solenoid-operated valve for increasing the braking pressure applied to said each wheel.

5. A control apparatus according to claim 2, wherein said rule selecting means selects, from said plurality of duty-cycle determining rules, said second determining rule wherein the duty cycle of said corresponding one solenoid-operated valve is determined based on (b) said time derivative of said wheel speed error, and said duty-cycle determining means determines, according to said second determining rule, said duty cycle of said corresponding one solenoid-operated valve for decreasing the braking pressure applied to said each wheel.

6. A control apparatus according to claim 2, wherein said rule selecting means selects, from said plurality of duty-cycle determining rules, said second determining rule wherein the duty cycle of said corresponding one solenoid-operated valve is determined based on (a) said wheel speed error, and said duty-cycle determining means determines, according to said second determining rule, said duty cycle of said corresponding one solenoid-operated valve for decreasing the braking pressure applied to said each wheel.

7. A control apparatus according to claim 1, wherein said rule selecting means of said controller comprises a driver's operable input device for selecting one of said plurality of duty-cycle determining rules.

8. A control apparatus according to claim 1, wherein said controller comprises means for determining said target wheel speed by multiplying said ground-speed of the vehicle by a slip coefficient.

9. A control apparatus according to claim 1, wherein said controller comprises:

mode selecting means for estimating a slipping condition of said each wheel based on at least one of said actual speed of said each wheel and said time derivative of said actual speed of said each wheel and selecting, based on the estimated slipping condition of said each wheel, one of a pressure-decrease mode, a pressure-increase mode, and a pressure-hold mode for carrying out an anti-lock braking-pressure regulating operation for regulating the braking pressure applied to said each wheel, when said mode selecting means selects said pressure-decrease mode, said rule selecting means selects said second determining rule wherein the duty cycle of said corresponding one solenoid-operated valve is determined based on (b) said time derivative of said wheel speed error, when said mode selecting means selects said pressure-increase mode and simultaneously when said time derivative of said actual wheel speed of said each wheel is greater than a time derivative of said target wheel speed, said rule selecting means selects said first determining rule, when said mode selecting means selects said pressure-increase mode and simultaneously when said time derivative of said actual wheel speed of said each wheel is not greater than said time derivative of said target wheel speed, said rule selecting means selects said second determining rule wherein the duty cycle of said corresponding one solenoid-operated valve is determined based on (a) said wheel speed error; and solenoid-operated valve energizing means as said solenoid-operated valve operating means for energizing said corresponding one solenoid-operated valve at the duty cycle determined according to said selected one duty-cycle determining rule, for carrying out the selected one pressure-regulate mode in said anti-lock braking-pressure regulating operation.

10. A control apparatus according to claim 9, wherein when said actual wheel speed of said each wheel becomes not greater than said target wheel speed, said mode selecting means judges that it is necessary to start said anti-lock braking-pressure regulating operation, and selects said pressure-decrease mode for starting said anti-lock braking-pressure regulating operation.

11. A control apparatus according to claim 9, wherein when said actual wheel speed of said each wheel becomes not greater than said target wheel speed, said mode selecting means judges that it is necessary to start said anti-lock braking-pressure regulating operation, and selects said pressure-decrease mode for starting said anti-lock braking-pressure regulating operation, said controller further comprising pressure-hold means for, when said actual wheel speed of said each wheel is greater than said target wheel speed and simultaneously when said time derivative of said actual wheel speed of said each wheel is lower than a negative reference value, holding the braking pressure applied to said each wheel before commencement of said pressure-decrease mode.

12. A control apparatus according to claim 11, wherein when said actual wheel speed of said each wheel exceeds said target wheel speed after said commencement of said pressure-decrease mode, said mode selecting means selects said pressure-increase mode for continuing said anti-lock braking-pressure regulating operation.

13. A control apparatus according to claim 12, wherein when said actual wheel speed of said each wheel does not exceed said target wheel speed and simultaneously when said time derivative of said actual wheel speed of said each wheel exceeds said time derivative of said target wheel speed, after said commencement of said pressure-decrease mode, said mode selecting means selects said pressure-hold mode for continuing said anti-lock braking-pressure regulating operation.

14. A control apparatus according to claim 1, wherein said controller comprises:
- mode selecting means for estimating a slipping condition of said each wheel based on at least one of said actual speed of said each wheel and said time derivative of said actual speed of said each wheel and selecting, based on the estimated slipping condition of said each wheel, one of a pressure-decrease mode, a pressure-increase mode, and a pressure-hold mode for carrying out an anti-lock braking-pressure regulating operation for regulating the braking pressure applied to said each wheel,
- when said mode selecting means selects said pressure-decrease mode, said rule selecting means selects said second determining rule wherein the duty cycle of said corresponding one solenoid-operated valve is determined based on (a) said wheel speed error,
- when said mode selecting means selects said pressure-increase mode and simultaneously when said time derivative of said actual wheel speed of said each wheel is greater than a time derivative of said target wheel speed, said rule selecting means selects said first determining rule,
- when said mode selecting means selects said pressure-increase mode and simultaneously when said time derivative of said actual wheel speed of said each wheel is not greater than said time derivative of said target wheel speed, said rule selecting means selects said second determining rule wherein said duty cycle of said corresponding one solenoid-operated valve is determined based on (a) said wheel speed error; and
- solenoid-operated valve energizing means as said solenoid-operated valve operating means for energizing said corresponding one solenoid-operated valve at the duty cycle determined according to said selected one duty-cycle determining rule, for carrying out the selected one pressure-regulate mode in said anti-lock braking-pressure regulating operation.

* * * * *